United States Patent
Kim

(10) Patent No.: US 12,526,664 B2
(45) Date of Patent: Jan. 13, 2026

(54) METHOD AND APPARATUS FOR PERFORMING MEASUREMENT UNDER A LONG PROPAGATION DELAY IN A WIRELESS COMMUNICATION SYSTEM

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 524 days.

(21) Appl. No.: 17/922,841

(22) PCT Filed: Apr. 23, 2021

(86) PCT No.: PCT/KR2021/005169
§ 371 (c)(1),
(2) Date: Nov. 2, 2022

(87) PCT Pub. No.: WO2021/230523
PCT Pub. Date: Nov. 18, 2021

(65) Prior Publication Data
US 2023/0164602 A1    May 25, 2023

(30) Foreign Application Priority Data
May 15, 2020 (KR) ........................ 10-2020-0058284

(51) Int. Cl.
*H04W 24/00* (2009.01)
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS

2013/0012188 A1*  1/2013  Gao ................. H04W 36/0085
455/422.1
2018/0084448 A1*  3/2018  Yang ....................... H04L 5/003
(Continued)

FOREIGN PATENT DOCUMENTS

KR    20190018659    2/2019

OTHER PUBLICATIONS

3GPP, "3rd Generation Partnership Project; Technical Specification Group Radio Access Network; NR; Radio Resource Control (RRC) protocol specification (Release 16)," TS 38.331 V16.0.0, dated Mar. 2020, 833 pages.

(Continued)

*Primary Examiner* — Abdelillah Elmejjarmi
(74) *Attorney, Agent, or Firm* — Fish & Richardson P.C.

(57) ABSTRACT

A method and apparatus for performing measurement under a long propagation delay in a wireless communication system is provided. A wireless device receives, from a network, a measurement configuration including an information on a basic measurement window and an information on a first additional measurement window. A wireless device performs a measurement within the basic measurement window. A wireless device performs a measurement within the first additional measurement window, based on measurement results from the basic measurement window. A wireless device reports, to the network, measurement results from the basic measurement window and the first additional measurement window.

16 Claims, 18 Drawing Sheets

(56) References Cited

U.S. PATENT DOCUMENTS

| | | |
|---|---|---|
| 2019/0320355 A1 | 10/2019 | Da Silva |
| 2020/0146095 A1* | 5/2020 | Hsieh .................... H04W 76/28 |
| 2023/0018838 A1* | 1/2023 | Deogun ................ H04B 7/024 |

OTHER PUBLICATIONS

LG Electronics, "Initial access and mobility for NR unlicensed operation," R1-1808508, Presented at 3GPP TSG RAN WG1 Meeting #94, Gothenburg, Sweden, Aug. 20-24, 2018, 12 pages.

Motorola Mobility & Lenovo, "SS/PBCH block based measurement in wideband carrier," R1-1716639, Presented at 3GPP TSG RAN WG1 NR Ad-Hoc #3, Nagoya, Japan, Sep. 18-21, 2017, 4 pages.

Qualcomm Incorporated, "Proposal for SSB extensions for IAB," R1-1900879, Presented at 3GPP TSG RAN WG1 Meeting AH1901, Taipei, Taiwan, Jan. 21-Jan. 25, 2019, 3 pages.

* cited by examiner

METHOD AND APPARATUS FOR PERFORMING MEASUREMENT UNDER A LONG PROPAGATION DELAY IN A WIRELESS COMMUNICATION SYSTEM

CROSS-REFERENCE TO RELATED APPLICATIONS

This application is a National Stage application under 35 U.S.C. § 371 of International Application No. PCT/KR2021/005169, filed on Apr. 23, 2021, which claims the benefit of Korean Patent Application No. 10-2020-0058284, filed on May 15, 2020. The disclosures of the prior applications are incorporated by reference in their entirety.

TECHNICAL FIELD

The present disclosure relates to a method and apparatus for performing measurement under a long propagation delay in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

To minimize the power consumed by performing the measurement, a wireless device may be configured with the measurement window and perform the measurement only within the configured measurement window. For example, a wireless device may perform the synchronization signals (SS) and/or physical broadcast channel (PBCH) block based measurement within the SSB based measurement timing configuration (SMTC) (for example, SS/PBCH block measurement timing configuration).

The measurement window should be configured accurately to include all reference signals that the wireless device should measure. If the measurement window is configured incorrectly, wireless device cannot measure all reference signals. In this case, the wireless device may acquire inaccurate measurement result for the serving or neighbour cell.

Therefore, studies for performing measurement under a long propagation delay in a wireless communication system are required.

In an aspect, a method performed by a wireless device in a wireless communication system is provided. A wireless device receives, from a network, a measurement configuration including an information on a basic measurement window and an information on a first additional measurement window. A wireless device performs a measurement within the basic measurement window. A wireless device performs a measurement within the first additional measurement window, based on measurement results from the basic measurement window. A wireless device reports, to the network, measurement results from the basic measurement window and the first additional measurement window.

In another aspect, an apparatus for implementing the above method is provided.

The present disclosure can have various advantageous effects.

According to some embodiments of the present disclosure, a wireless device could efficiently perform measurement under a long propagation delay.

According to some embodiments of the present disclosure, a wireless communication system could efficiently provide a solution for measurement under a long propagation delay.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
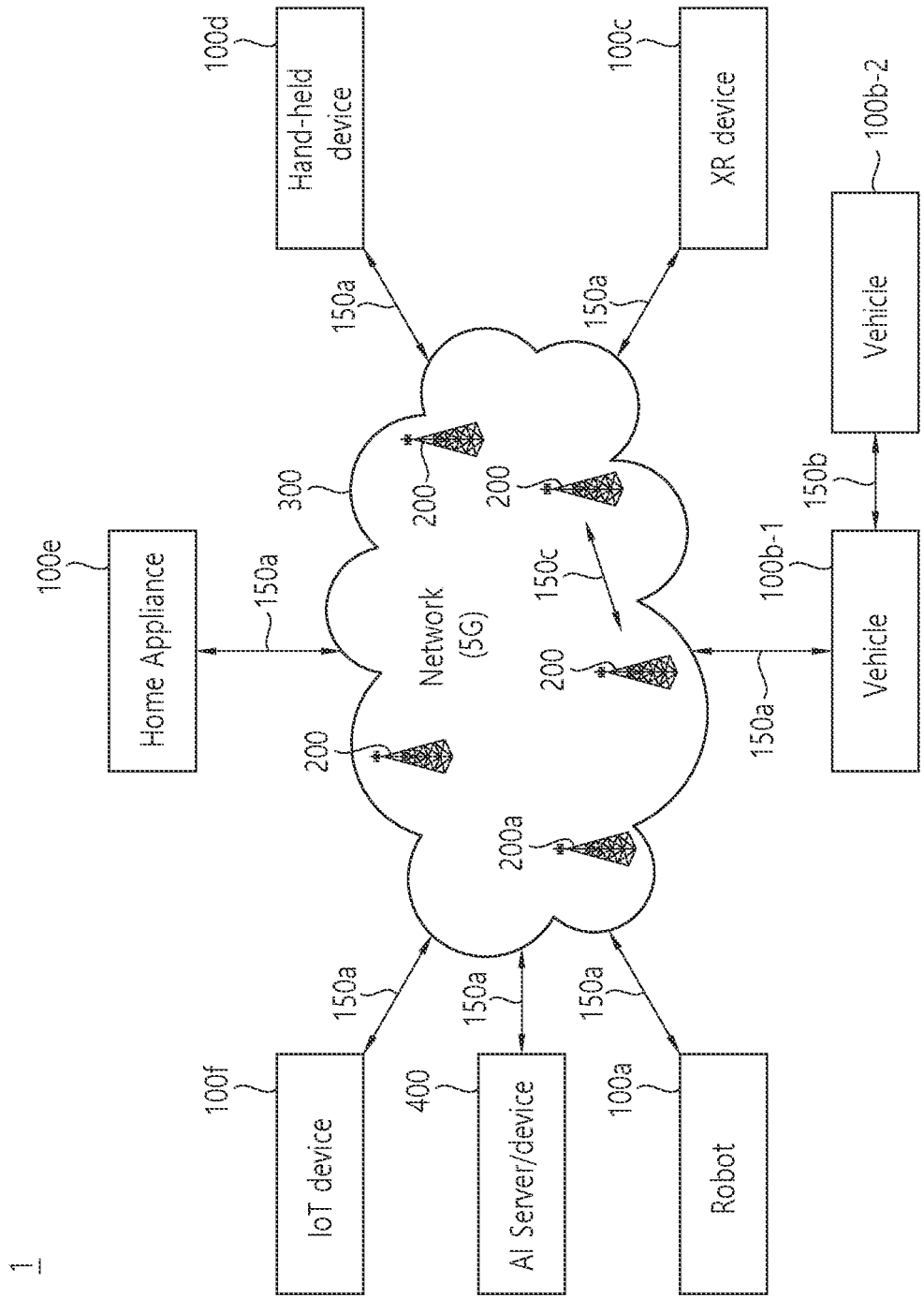
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WIMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL, LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma ( ) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring, Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f,* base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from other each through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802. 15.4 and may be called various names.

Figure 2:
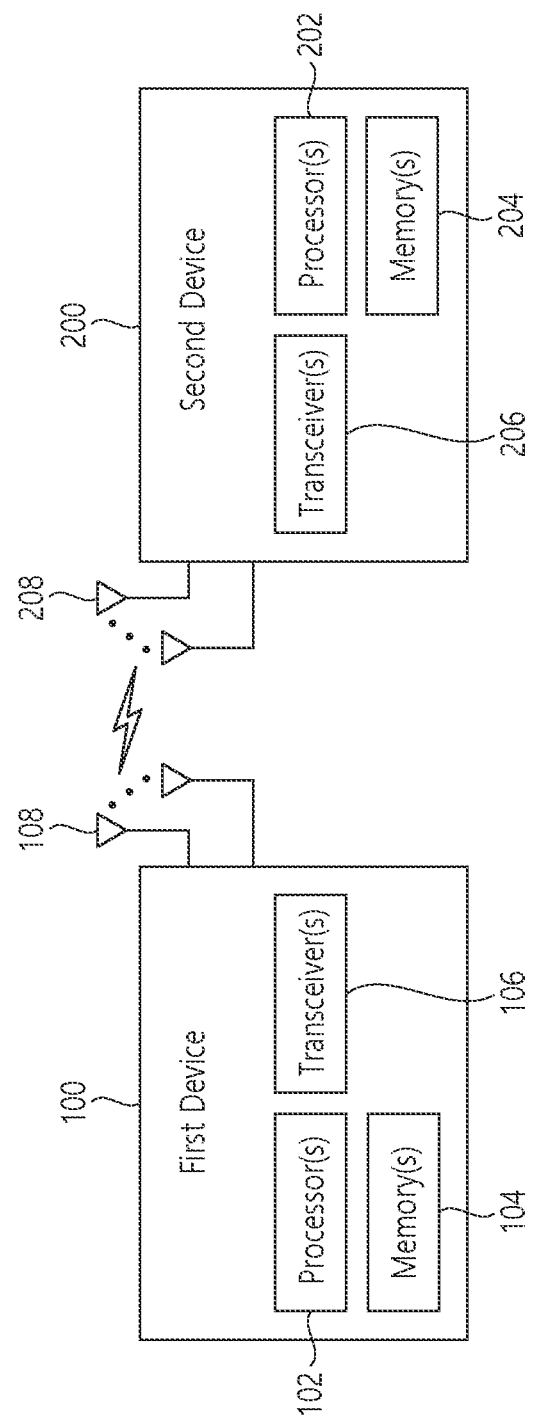
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or agNB.

Figure 3:
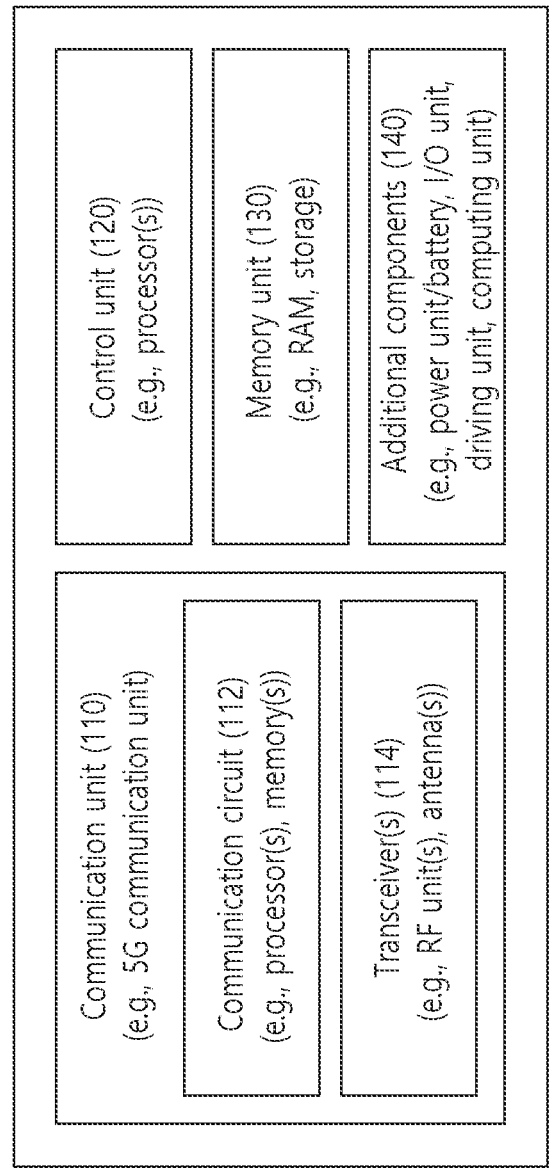
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
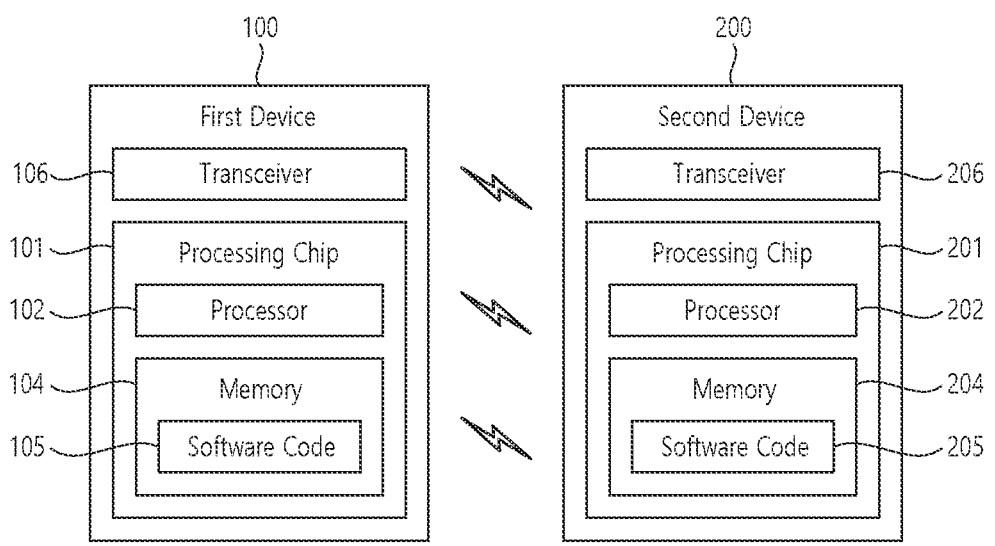
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
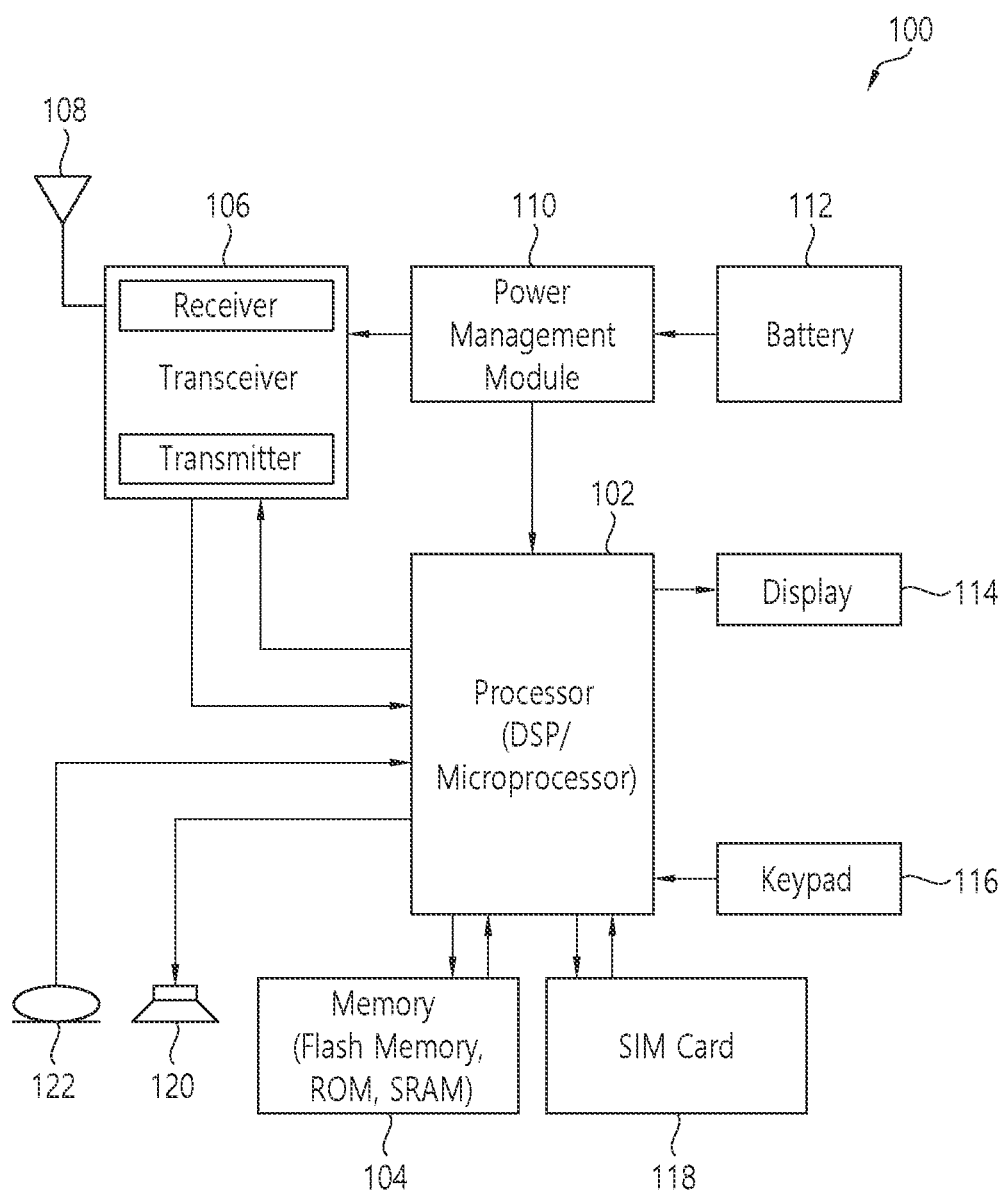
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple™, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
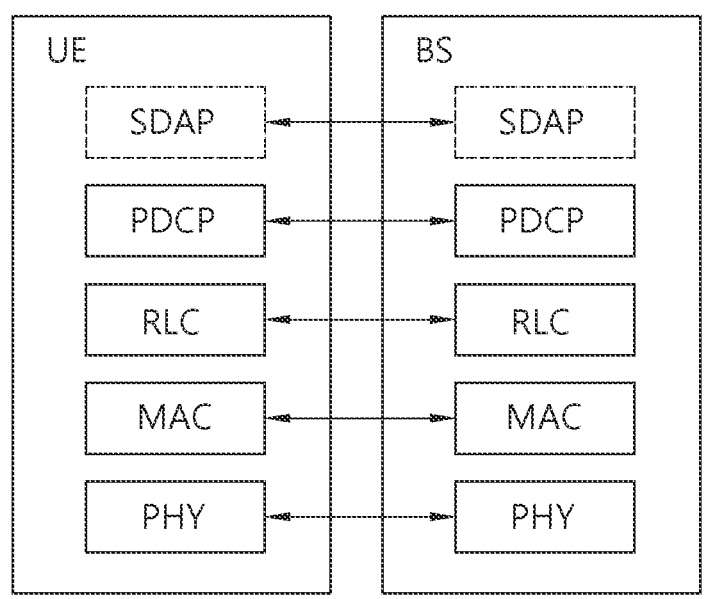
FIGS. 6 and 7 show an example of protocol stacks in a 3GPP based wireless communication system to which implementations of the present disclosure is applied.
Figure 7:
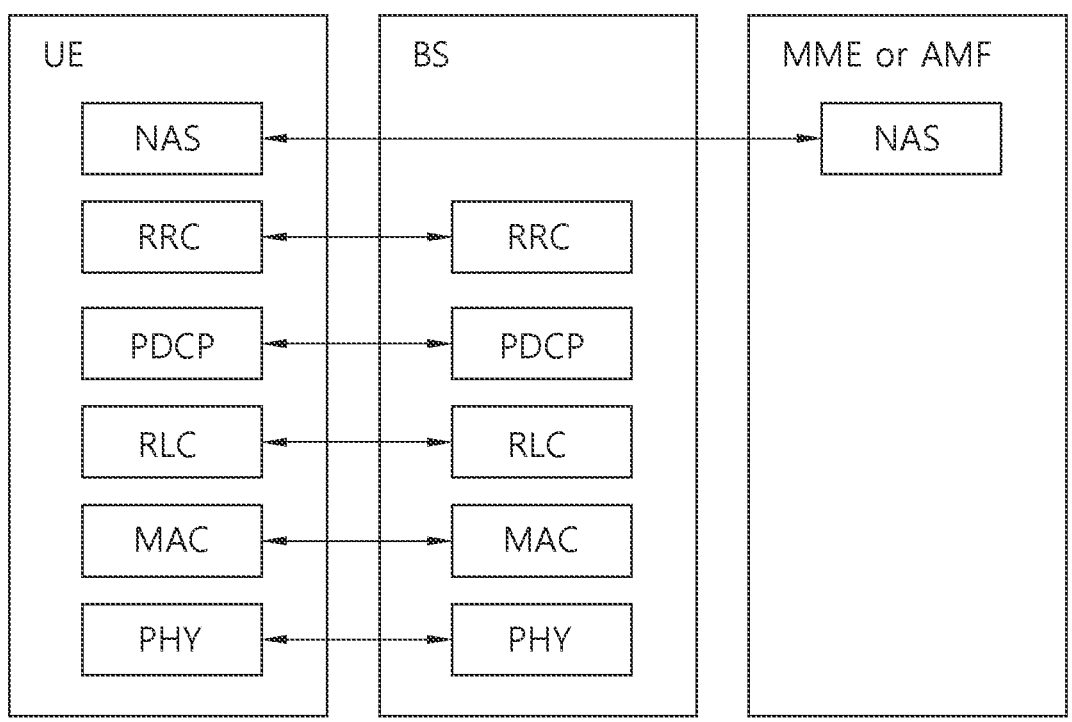

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (Qos) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DOCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
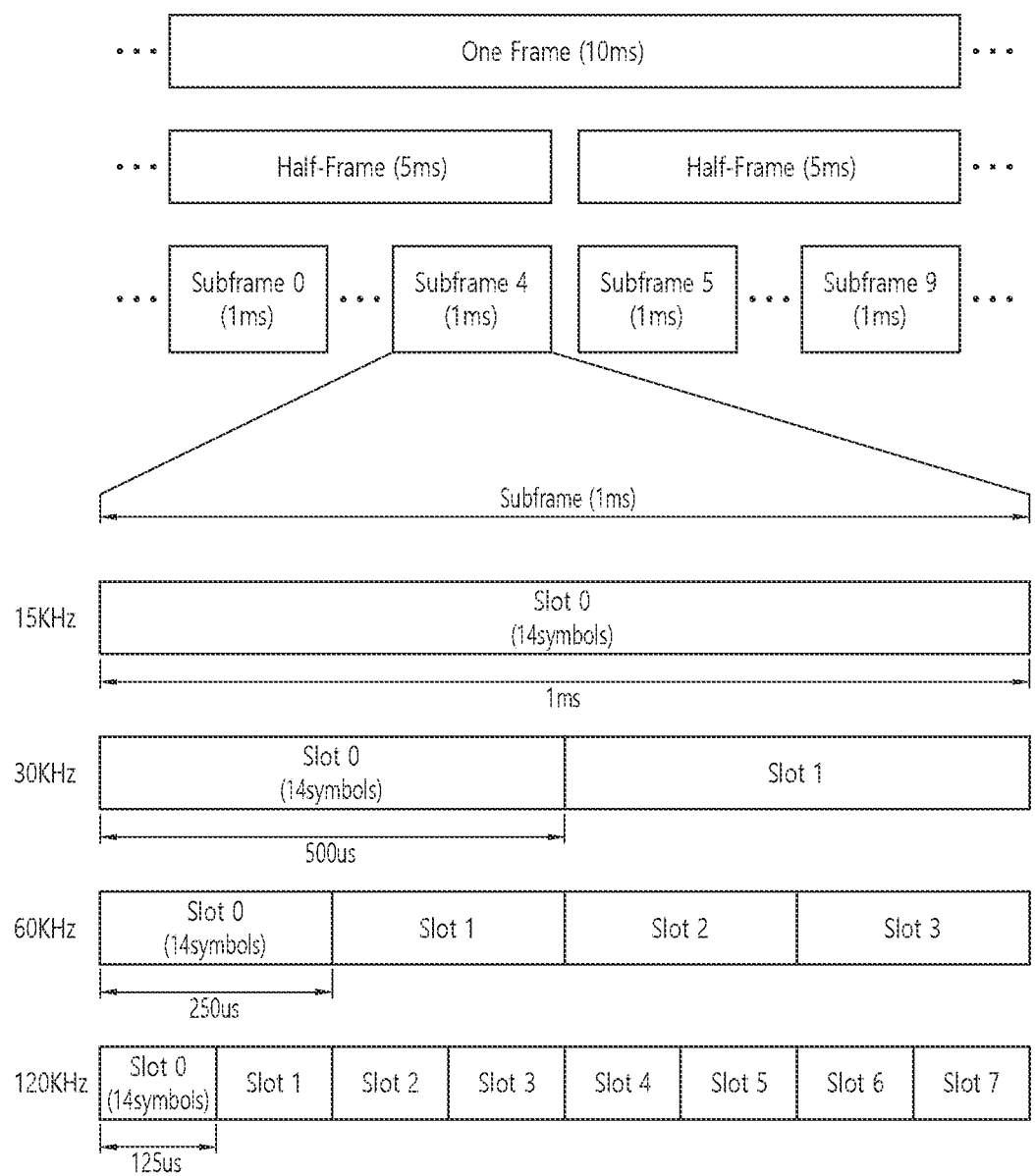
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ KHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ KHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ KHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i-1}$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For case of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHZ, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
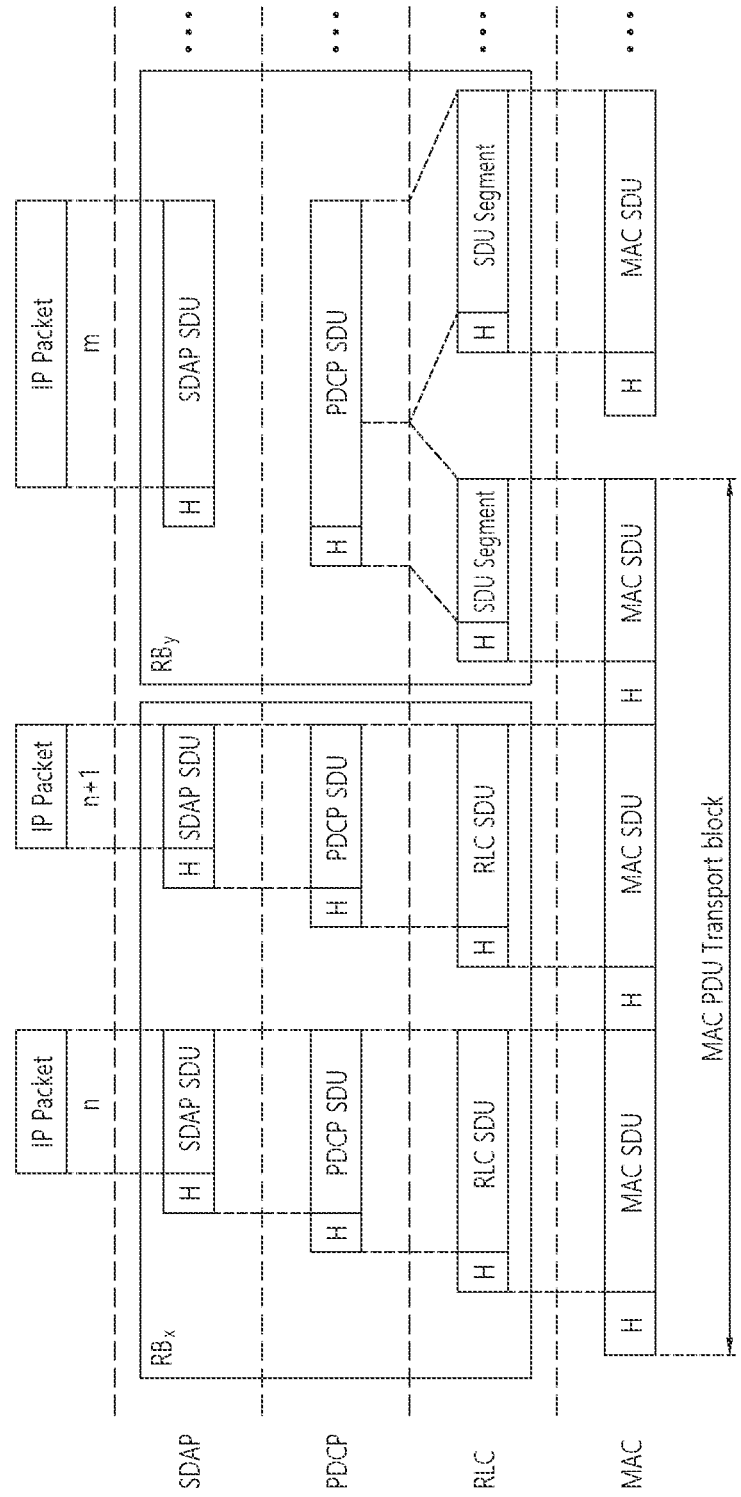
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, Measurements procedure is described. Section 5.5 of 3GPP TS 38.331 v16.0.0 may be referred.

The network may configure an RRC_CONNECTED UE to perform measurements. The network may configure the UE to report them in accordance with the measurement configuration or perform conditional configuration evaluation in accordance with the conditional configuration. The measurement configuration is provided by means of dedicated signalling i.e. using the RRCReconfiguration or RRCResume.

The network may configure the UE to perform the following types of measurements:
  NR measurements;
  Inter-RAT measurements of E-UTRA frequencies.
  Inter-RAT measurements of UTRA-FDD frequencies.
  The network may configure the UE to report the following measurement information based on SS/PBCH block(s):
    Measurement results per SS/PBCH block;
    Measurement results per cell based on SS/PBCH block(s);
    SS/PBCH block(s) indexes.
  The network may configure the UE to report the following measurement information based on CSI-RS resources:
    Measurement results per CSI-RS resource;
    Measurement results per cell based on CSI-RS resource(s);
    CSI-RS resource measurement identifiers.
  The network may configure the UE to perform the following types of measurements for sidelink:
    CBR measurements.
  The network may configure the UE to report the following measurement information based on SRS resources:
    Measurement results per SRS resource;
    SRS resource(s) indexes.

The network may configure the UE to report the following measurement information based on CLI-RSSI resources:
  Measurement results per CLI-RSSI resource;
  CLI-RSSI resource(s) indexes.

The measurement configuration includes the following parameters:

1. Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For CBR measurement of NR sidelink communication, a measurement object is a set of transmission resource pool(s) on a single carrier frequency for NR sidelink communication.

For CBR measurement of V2X sidelink communication, a measurement object is a set of transmission resource pool(s) on a carrier frequency for V2X sidelink communication.

For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

In case of conditional configuration triggering configuration, each configuration consists of the following:

Execution criteria: The criteria that triggers the UE to perform conditional configuration execution.

RS type: The RS that the UE uses for beam and cell measurement results (SS/PBCH block or CSI-RS) for conditional configuration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional configuration triggering, one measurement identity links to exactly one conditional configuration trigger configuration. And up to 2 measurement identities can be linked to one conditional configuration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in this specification. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The NR serving cell(s)—these are the SpCell and one or more SCells.

2. Listed cells—these are cells listed within the measurement object(s).

3. Detected cells—these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells and, for RSSI and channel occupancy measurements, the UE measures and reports on any reception on the indicated frequency. For inter-RAT measurements object(s) of UTRA-FDD, the UE measures and reports on listed cells. For CLI measurement object(s), the UE measures and reports on configured CLI measurement resources (i.e. SRS resources and/or CLI-RSSI resources).

Whenever the procedural specification, other than contained in sub-clause 5.5.2, refers to a field it concerns a field included in the VarMeasConfig unless explicitly stated otherwise i.e. only the measurement configuration procedure covers the direct UE action related to the received measConfig.

The configurations related to CBR measurements are only included in the measConfig associated with MCG.

In this case, the UE maintains two independent VarMeasConfig and VarMeasReportList, one associated with each measConfig, and independently performs all the procedures for each measConfig and the associated VarMeasConfig and VarMeasReportList, unless explicitly stated otherwise.

Measurement configuration is described.

The network applies the procedure as follows:
- to ensure that, whenever the UE has a measConfig associated with a CG, it includes a measObject for the SpCell and for each NR SCell of the CG to be measured;
- to configure at most one measurement identity across all CGs using a reporting configuration with the reportType set to reportCGI;
- to configure at most one measurement identity per CG using a reporting configuration with the ul-DelayValueConfig;
- to ensure that, in the measConfig associated with a CG:
- for all SSB based measurements there is at most one measurement object with the same ssbFrequency;
- an smtc1 included in any measurement object with the same ssbFrequency has the same value and that an smtc2 included in any measurement object with the same ssbFrequency has the same value;
- to ensure that all measurement objects with the same ssbFrequency have the same ssbSubcarrier Spacing;
- to ensure that, if a measurement object associated with the MCG has the same ssbFrequency as a measurement object associated with the SCG:
- for that ssbFrequency, the measurement window according to the smtc1 configured by the MCG includes the measurement window according to the smtc1 configured by the SCG, or vice-versa, with an accuracy of the maximum receive timing difference.
- if both measurement objects are used for RSSI measurements, bits in measurementSlots in both objects corresponding to the same slot are set to the same value. Also, the endSymbol is the same in both objects.
- to ensure that, if a measurement object has the same ssbFrequency as a measurement object:
- for that ssbFrequency, the measurement window according to the smtc includes the measurement window according to the smtc1, or vice-versa, with an accuracy of the maximum receive timing difference.
- if both measurement objects are used for RSSI measurements, bits in measurementSlots in both objects corresponding to the same slot are set to the same value. Also, the endSymbol is the same in both objects.
- when the UE is in NE-DC, NR-DC, or NR standalone, to configure at most one measurement identity across all CGs using a reporting configuration with the reportType set to reportSFTD;

For CSI-RS resources, the network applies the procedure as follows:
- to ensure that all CSI-RS resources configured in each measurement object have the same center frequency, (startPRB+floor (nrofPRBs/2)) Measurement gap configuration is described.

The UE shall:
1> if gapFR1 is set to setup:
2> if an FR1 measurement gap configuration is already setup, release the FR1 measurement gap configuration;
2> setup the FR1 measurement gap configuration indicated by the measGapConfig in accordance with the received gapOffset;
2> apply the specified timing advance mgta to the gap occurrences calculated above (i.e. the UE starts the measurement mgta ms before the gap subframe occurrences);
1> else if gapFR1 is set to release:
2> release the FR1 measurement gap configuration;
1> if gapFR2 is set to setup:
2> if an FR2 measurement gap configuration is already setup, release the FR2 measurement gap configuration;
2> setup the FR2 measurement gap configuration indicated by the measGapConfig in accordance with the received gapOffset;
2> apply the specified timing advance mgta to the gap occurrences calculated above (i.e. the UE starts the measurement mgta ms before the gap subframe occurrences);
1> else if gapFR2 is set to release:
2> release the FR2 measurement gap configuration;
1> if gapUE is set to setup:
2> if a per UE measurement gap configuration is already setup, release the per UE measurement gap configuration;
2> setup the per UE measurement gap configuration indicated by the measGapConfig in accordance with the received gapOffset;
2> apply the specified timing advance mgta to the gap occurrences calculated above (i.e. the UE starts the measurement mgta ms before the gap subframe occurrences);
1> else if gapUE is set to release:
2> release the per UE measurement gap configuration.

For gapFR2 configuration with synchronous CA, for the UE in NE-DC or NR-DC, the SFN and subframe of the serving cell indicated by the refServCellIndicator in gapFR2 is used in the gap calculation. Otherwise, the SFN and subframe of a serving cell on FR2 frequency is used in the gap calculation For gapFR1 or gapUE configuration, for the UE in NE-DC or NR-DC, the SFN and subframe of the serving cell indicated by the refServCellIndicator in corresponding gapFR1 or gapUE is used in the gap calculation. Otherwise, the SFN and subframe of the PCell is used in the gap calculation.

For gapFR2 configuration with asynchronous CA, for the UE in NE-DC or NR-DC, the SFN and subframe of the serving cell indicated by the refServCellIndicator and refFR2ServCellAsyncCA in gapFR2 is used in the gap calculation. Otherwise, the SFN and subframe of a serving cell on FR2 frequency indicated by the refFR2ServCellAsyncCA in gapFR2 is used in the gap calculation Reference signal measurement timing configuration is described.

The UE shall setup the first SS/PBCH block measurement timing configuration (SMTC) in accordance with the received periodicityAndOffset parameter (providing Periodicity and Offset value for the following condition) in the smtc1 configuration.

RSSI measurement timing configuration is described.

The UE shall setup the RSSI measurement timing configuration (RMTC) in accordance with the received rmtc-Periodicity, rmtc-SubframeOffset if configured otherwise determined by the UE randomly;

On the concerned frequency, the UE shall not consider RSSI measurements outside the configured RMTC occasion which lasts for measDuration for RSSI and channel occupancy measurements.

Performing measurements procedure is described.

An RRC_CONNECTED UE shall derive cell measurement results by measuring one or multiple beams associated per cell as configured by the network. For all cell measurement results and CLI measurement results in RRC_CONNECTED, except for RSSI, the UE applies the layer 3 filtering, before using the measured results for evaluation of reporting criteria, measurement reporting or the criteria to trigger conditional configuration execution. For cell measurements, the network can configure RSRP, RSRQ, SINR, RSCP or EcNO as trigger quantity. For CLI measurements, the network can configure SRS-RSRP or CLI-RSSI as trigger quantity. For cell and beam measurements, reporting quantities can be any combination of quantities (i.e. only RSRP; only RSRQ; only SINR; RSRP and RSRQ; RSRP and SINR; RSRQ and SINR; RSRP, RSRQ and SINR; only RSCP; only EcNO; RSCP and EcNO), irrespective of the trigger quantity, and for CLI measurements, reporting quantities can be only SRS-RSRP or only CLI-RSSI. For conditional configuration execution triggering quantities, the network can configure up to 2 quantities. The UE does not apply the layer 3 filtering to derive the CBR measurements.

The network may also configure the UE to report measurement information per beam (which can either be measurement results per beam with respective beam identifier(s) or only beam identifier(s)). If beam measurement information is configured to be included in measurement reports, the UE applies the layer 3 beam filtering. On the other hand, the exact L1 filtering of beam measurements used to derive cell measurement results is implementation dependent.

The UE shall:
1> whenever the UE has a measConfig, perform RSRP and RSRQ measurements for each serving cell for which servingCellMO is configured as follows:
2> if the reportConfig associated with at least one measId included in the measIdList within VarMeasConfig contains an rsType set to ssb and ssb-ConfigMobility is configured in the measObject indicated by the servingCellMO:
3> if the reportConfig associated with at least one measId included in the measIdList within VarMeasConfig contains a reportQuantityRS-Indexes and maxNrofRS-IndexesToReport and contains an rsType set to ssb:
4> derive layer 3 filtered RSRP and RSRQ per beam for the serving cell based on SS/PBCH block;
3> derive serving cell measurement results based on SS/PBCH block;
2> if the reportConfig associated with at least one measId included in the measIdList within VarMeasConfig contains an rsType set to csi-rs and CSI-RS-ResourceConfigMobility is configured in the measObject indicated by the servingCellMO:
3> if the reportConfig associated with at least one measId included in the measIdList within VarMeasConfig contains a reportQuantityRS-Indexes and maxNrofRS-IndexesToReport and contains an rsType set to csi-rs:
4> derive layer 3 filtered RSRP and RSRQ per beam for the serving cell based on CSI-RS;
3> derive serving cell measurement results based on CSI-RS;
1> for each serving cell for which servingCellMO is configured, if the reportConfig associated with at least one measId included in the measIdList within VarMeasConfig contains SINR as trigger quantity and/or reporting quantity:
2> if the reportConfig contains rsType set to ssb and ssb-ConfigMobility is configured in the servingCellMO:
3 if the reportConfigcontains a reportQuantityRS-Indexes and maxNrofRS-IndexesToReport:
4> derive layer 3 filtered SINR per beam for the serving cell based on SS/PBCH block;
3> derive serving cell SINR based on SS/PBCH block;
2> if the reportConfig contains rsType set to csi-rs and CSI-RS-ResourceConfigMobility is configured in the servingCellMO:
3> if the reportConfigcontains a reportQuantityRS-Indexes and maxNrofRS-IndexesToReport:
4> derive layer 3 filtered SINR per beam for the serving cell based on CSI-RS;
3> derive serving cell SINR based on CSI-RS;
1> for each measId included in the measIdList within VarMeasConfig:
2> if the reportType for the associated reportConfig is set to reportCGI and timer T321 is running:
3> if useAutonomousGaps is configured for the associated reportConfig:
4> perform the corresponding measurements on the frequency and RAT indicated in the associated measObject using autonomous gaps as necessary;
3> else:
4> perform the corresponding measurements on the frequency and RAT indicated in the associated measObject using available idle periods;
3> if the cell indicated by reportCGI field for the associated measObject is an NR cell and that indicated cell is broadcasting SIBI:
4> try to acquire SIBI in the concerned cell;
3> if the cell indicated by reportCGI field is an E-UTRA cell:
4> try to acquire SystemInformationBlockType1 in the concerned cell;
2> if the ul-DelayValueConfig is configured for the associated reportConfig:
3> ignore the measObject;
3> for each of the configured DRBs, configure the PDCP layer to perform corresponding average UL PDCP packet delay measurement per DRB;
2> if the reportType for the associated reportConfig is periodical, eventTriggered or condTriggerConfig:
3> if a measurement gap configuration is setup, or
3> if the UE does not require measurement gaps to perform the concerned measurements:
4> if s-MeasureConfig is not configured, or
4> if s-MeasureConfig is set to ssb-RSRP and the NR SpCell RSRP based on SS/PBCH block, after layer 3 filtering, is lower than ssb-RSRP, or
4> if s-MeasureConfig is set to csi-RSRP and the NR SpCell RSRP based on CSI-RS, after layer 3 filtering, is lower than csi-RSRP:
5> if the measObject is associated to NR and the rsType is set to csi-rs:
6> if reportQuantityRS-Indexes and maxNrofRS-IndexesToReport for the associated reportConfig are configured:
7> derive layer 3 filtered beam measurements only based on CSI-RS for each measurement quantity indicated in reportQuantityRS-Indexes;
6> derive cell measurement results based on CSI-RS for the trigger quantity and each measurement quantity indicated in reportQuantityCell using parameters from the associated measObject;
5> if the measObject is associated to NR and the rsType is set to ssb:
6> if reportQuantityRS-Indexes and maxNrofRS-IndexesToReport for the associated reportConfig are configured:

7> derive layer 3 beam measurements only based on SS/PBCH block for each measurement quantity indicated in reportQuantityRS-Indexes;
6> derive cell measurement results based on SS/PBCH block for the trigger quantity and each measurement quantity indicated in reportQuantityCell using parameters from the associated meas Object;
5> if the measObject is associated to E-UTRA:
6> perform the corresponding measurements associated to neighbouring cells on the frequencies indicated in the concerned measObject;
5> if the measObject is associated to UTRA-FDD:
6> perform the corresponding measurements associated to neighbouring cells on the frequencies indicated in the concerned measObject;
4> if the measRSSI-ReportConfig is configured in the associated reportConfig:
5> perform the RSSI and channel occupancy measurements on the frequency indicated in the associated measObject;
2> if the reportType for the associated reportConfig is set to reportSFTD:
3> if the reportSFTD-Meas is set to true:
4> if the measObject is associated to E-UTRA:
5> perform SFTD measurements between the PCell and the E-UTRA PSCell;
5> if the reportRSRP is set to true;
6> perform RSRP measurements for the E-UTRA PSCell;
4> else if the measObject is associated to NR:
5> perform SFTD measurements between the PCell and the NR PSCell;
5> if the reportRSRP is set to true;
6> perform RSRP measurements for the NR PSCell based on SSB;
3> else if the reportSFTD-NeighMeas is included:
4> if the measObject is associated to NR:
5> if the drx-SFTD-NeighMeas is included:
6> perform SFTD measurements between the PCell and the NR neighbouring cell(s) detected based on parameters in the associated measObject using available idle periods;
5> else:
6> perform SFTD measurements between the PCell and the NR neighbouring cell(s) detected based on parameters in the associated measObject;
5> if the reportRSRP is set to true:
6> perform RSRP measurements based on SSB for the NR neighbouring cell(s) detected based on parameters in the associated measObject;
2> if the reportType for the associated reportConfig is cli-Periodical or cli-EventTriggered:
3> perform the corresponding measurements associated to CLI measurement resources indicated in the concerned meas ObjectCLI;
2> perform the evaluation of reporting criteria, except if reportConfig is condTriggerConfig.

The UE capable of CBR measurement when configured to transmit NR sidelink communication shall:
1> If the frequency used for NR sidelink communication is included in sl-FreqInfoToAddModList in sl-ConfigDedicatedNR within RRCReconfiguration message or included in sl-ConfigCommonNR within SIB12:
2> if the UE is in RRC IDLE or in RRC INACTIVE:
3> if the cell chosen for NR sidelink communication provides SIB12 which includes sl-TxPoolSelectedNormal or sl-TxPoolExceptional for the concerned frequency:
4> perform CBR measurement on pools in sl-TxPoolSelectedNormal and sl-TxPoolExceptional for the concerned frequency in SIB12;
2> if the UE is in RRC_CONNECTED:
3> if tx-PoolMeasToAddModList is included in VarMeasConfig:
4> perform CBR measurements on each transmission resource pool indicated in the tx-PoolMeasToAddModList;
3> if sl-TxPoolSelectedNormal, sl-TxPoolScheduling or sl-TxPoolExceptional is included in sl-ConfigDedicatedNR for the concerned frequency within RRCReconfiguration:
4> perform CBR measurement on pools in sl-TxPoolSelectedNormal, sl-TxPoolScheduling or sl-TxPoolExceptional if included in sl-ConfigDedicatedNR for the concerned frequency within RRCReconfiguration;
3> else if the cell chosen for NR sidelink communication provides SIB12 which includes sl-TxPoolSelectedNormal or sl-TxPoolExceptional for the concerned frequency:
4> perform CBR measurement on pools in sl-TxPoolSelectedNormal and sl-TxPoolExceptional for the concerned frequency in SIB12;
1> else:
2> perform CBR measurement on pools in sl-TxPoolSelectedNormal and sl-TxPoolExceptional in sl-PreconfigurationNR for the concerned frequency.

In case the configurations for NR sidelink communication and CBR measurement are acquired via the E-UTRA, configurations for NR sidelink communication in SIB12, sl-ConfigDedicatedNR within RRCReconfiguration used in this subclause are provided by the configurations in SystemInformationBlockTypeXX2, sl-ConfigDedicatedNR within RRCConnectionReconfiguration, respectively.

If a UB that is configured by upper layers to transmit V2X sidelink communication is configured with transmission resource pool(s) and the measurement objects concerning V2X sidelink communication (i.e. measObjectEUTRA-SL) by NR, it shall perform CBR measurement, based on the transmission resource pool(s) and the measurement object(s) concerning V2X sidelink communication configured by NR.

Derivation of cell measurement results is described.
The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

Non-terrestrial networks (NTN) in 5G NR is described. Section 3 and Section 4 of
3GPP TR 38.821 V16.0.0 (2020-01) can be referred.
NIN means networks, or segments of networks, using an airborne or space-borne vehicle to embark a transmission equipment relay node or base station. In NTN, the following terms may be used.

Feeder link: Wireless link between NTN Gateway and satellite

Geostationary Earth orbit: Circular orbit at 35,786 km above the Earth's equator and following the direction of the Earth's rotation. An object in such an orbit has an orbital period equal to the Earth's rotational period and thus appears motionless, at a fixed position in the sky, to ground observers.

Low Earth Orbit: Orbit around the Earth with an altitude between 300 km, and 1500 km.

Medium Earth Orbit: region of space around the Earth above low Earth orbit and below geostationary Earth Orbit.

Non-Geostationary Satellites: Satellites (LEO and MEO) orbiting around the Earth with a period that varies approximately between 1.5 hour and 10 hours. It is necessary to have a constellation of several Non-Geostationary satellites associated with handover mechanisms to ensure a service continuity.

Non-terrestrial networks: Networks, or segments of networks, using an airborne or space-borne vehicle to embark a transmission equipment relay node or base station.

NTN-gateway: an earth station or gateway is located at the surface of Earth, and providing sufficient RF power and RF sensitivity for accessing to the satellite (resp. HAPS). NTN Gateway is a transport network layer (TNL) node.

One-way latency: time required to propagate through a telecommunication system from a terminal to the public data network or from the public data network to the terminal. This is especially used for voice and video conference applications.

Satellite: a space-borne vehicle embarking a bent pipe payload or a regenerative payload telecommunication transmitter, placed into Low-Earth Orbit (LEO), Medium-Earth Orbit (MEO), or Geostationary Earth Orbit (GEO).

Satellite beam: A beam generated by an antenna on-board a satellite

Transparent payload: payload that changes the frequency carrier of the uplink RF signal, filters and amplifies it before transmitting it on the downlink Unmanned Aircraft Systems: Systems encompassing Tethered UAS (TUA), Lighter Than Air UAS (LTA), Heavier Than Air UAS (HTA), all operating in altitudes typically between 8 and 50 km including High Altitude Platforms (HAPs)

User Connectivity: capability to establish and maintain data/voice/video transfer between networks and Terminals User Throughput: data rate provided to a terminal A non-terrestrial network refers to a network, or segment of networks using RF resources on board a satellite (or UAS platform).

Figure 10:
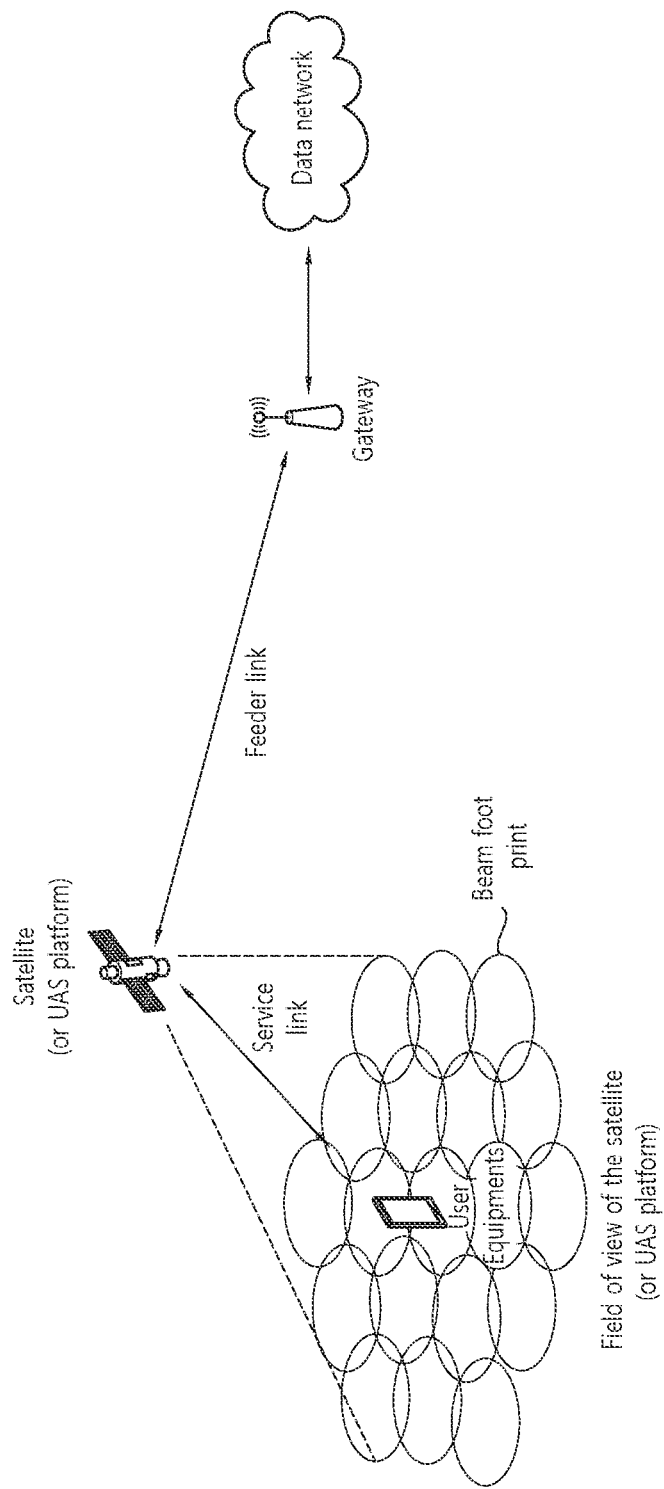
FIG. 10 and FIG. 11 show typical scenarios of a non-terrestrial network providing access to user equipment.
Figure 11:
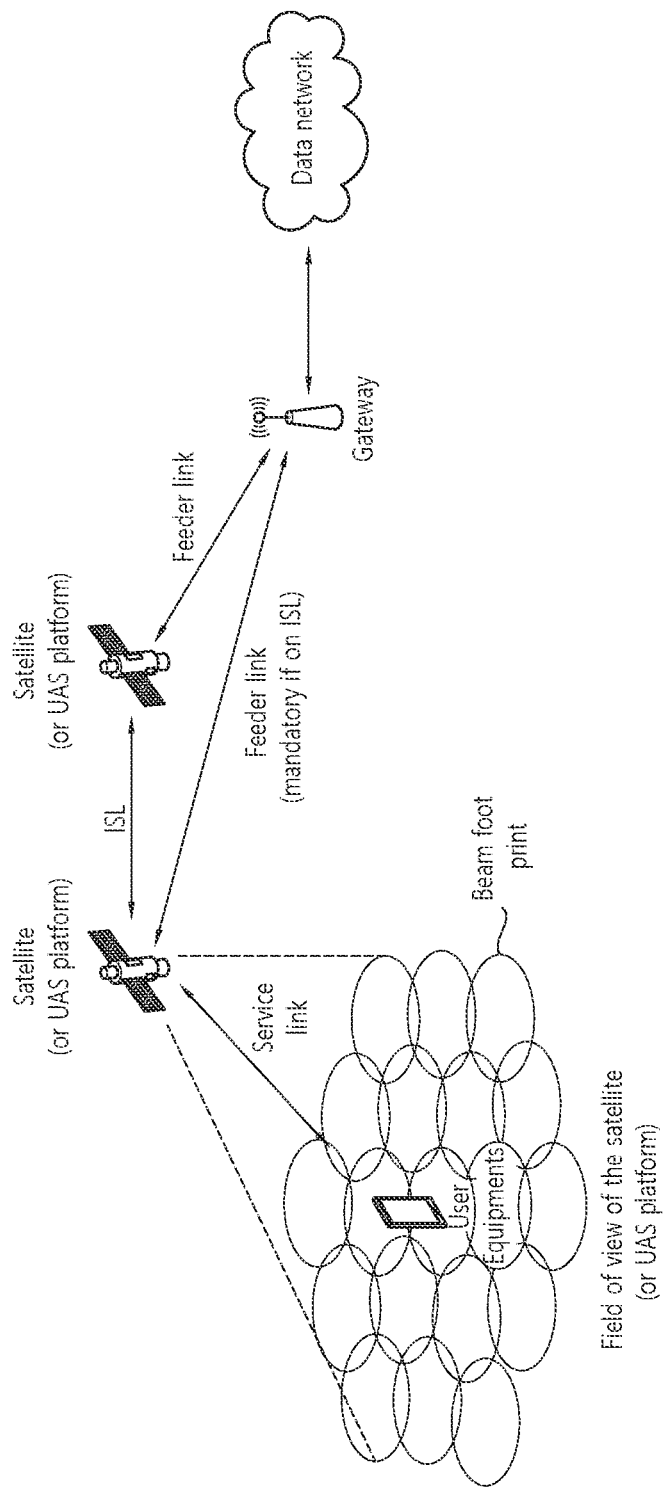

FIG. 10 and FIG. 11 show typical scenarios of a non-terrestrial network providing access to user equipment.

In particular, FIG. 10 illustrates an example of non-terrestrial network typical scenario based on transparent payload. FIG. 11 illustrates an example of non-terrestrial network typical scenario based on regenerative payload Non-Terrestrial Network typically features the following elements:

One or several sat-gateways that connect the Non-Terrestrial Network to a public data network a GEO satellite is fed by one or several sat-gateways which are deployed across the satellite targeted coverage (e.g. regional or even continental coverage). We assume that UE in a cell are served by only one sat-gateway A Non-GEO satellite served successively by one or several sat-gateways at a time. The system ensures service and feeder link continuity between the successive serving sat-gateways with sufficient time duration to proceed with mobility anchoring and hand-over A Feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generate beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment are served by the satellite (or UAS platform) within the targeted service area.

Meanwhile, to minimize the UE power consumed by performing the measurement, UE may be configured with the measurement window and perform the measurement only within the configured measurement window. For example, UE may perform the SS/PBCH block based measurement within the SMTC (SS/PBCH block measurement timing configuration).

The measurement window should be configured accurately to include all reference signals that the UE should measure. If the measurement window is configured incorrectly, UE cannot measure all reference signals. This means that the UE acquires inaccurate measurement result for the serving or neighbour cell.

For example, a propagation delay for NTN cell may be up to 541.46 ms. Therefore, if the network does not calculate the propagation delay for NTN cell accurately, the measurement window could not include all reference signals that the UE should measure at all, since only 1% of the propagation delay for NTN cell reaches up to 5 ms.

Therefore, studies for performing measurement under a long propagation delay in a wireless communication system are required.

Hereinafter, a method for performing measurement under a long propagation delay in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
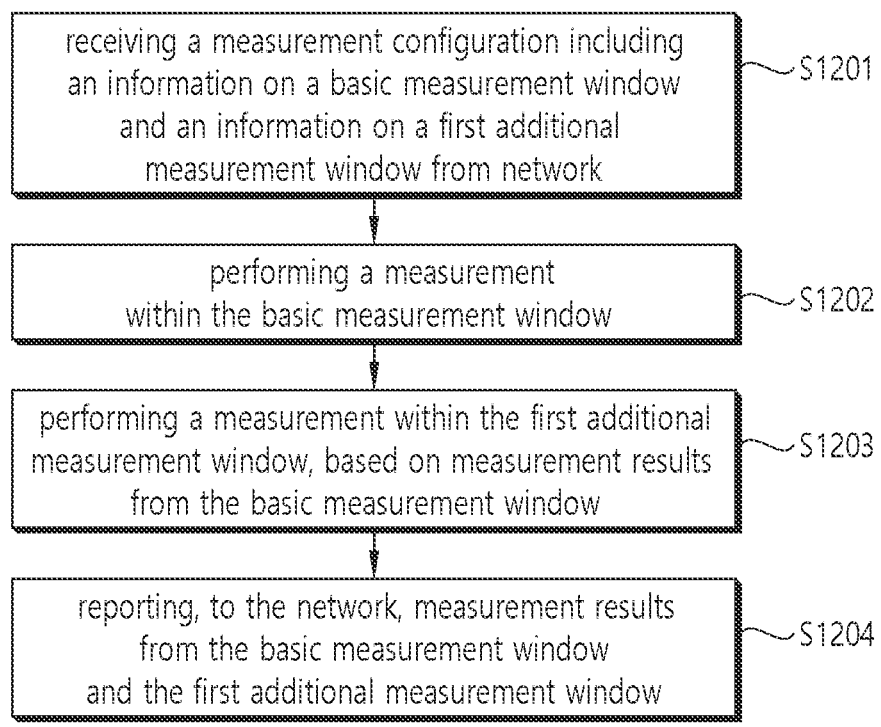
FIG. 12 shows an example of a method for performing measurement under a long propagation delay in a wireless communication system, according to some embodiments of the present disclosure.

FIG. 12 shows an example of a method for performing measurement under a long propagation delay in a wireless communication system, according to some embodiments of the present disclosure.

In particular, FIG. 12 shows an example of a method performed by a wireless device.

In step S1201, a wireless device may receive a measurement configuration including an information on a basic measurement window and an information on a first additional measurement window from a network.

For example, the first additional measurement window may start at the end of the basic measurement window. In other words, the starting point of the first additional measurement window may be the end of the basic measurement window.

For example, the basic measurement window and the first additional measurement window may have time period and range of frequencies. In other words, the basic measurement window and the first additional measurement window may consist of time period and range of frequencies. For example, the range of frequencies may include continuous frequencies and/or discrete frequencies.

For example, the basic measurement window and the first additional measurement window may have time period and group of frequencies. The group of frequencies may include the measurement objects included in the measurement configuration.

For example, the first additional measurement window may have same frequency range (or group of frequencies) with the basic measurement window. The first additional measurement window may have different time period from the basic measurement window. The time period of the first additional measurement window may be started at the end of the time period of the basic measurement window. For example, the time period of the first additional measurement window may be same with or different to the time period of the basic measurement window.

For example, the basic measurement window and/or the first additional measurement window may be configured per frequency, per cell, and/or per UE.

For example, the measurement configuration includes an information on multiple additional measurements windows. The first additional measurement window may be one of the multiple additional measurements windows.

For example, the measurement configuration may include (1) a length of one additional measurement window among the multiple additional measurement windows, and (2) a maximum number of the multiple additional measurement windows.

For example, the basic measurement window and the first additional measurement window includes at least one of (1) a measurement gap, (2) a synchronization signals (SS) and/or physical broadcast channel (PBCH) block measurement window, and/or (3) Channel State Information Reference Signal (CSI-RS) measurement window.

For example, the measurement configuration may include a threshold number to determine whether to keep performing a measurement within the additional measurement window.

For example, the threshold number may be a number of beams, a number of SS/PBCH blocks, and/or a number of CSI-RSs.

In step S1202, a wireless device may perform a measurement within the basic measurement window.

For example, a wireless device may perform the measurement for serving cell and/or at least one of neighbour cells based on the measurement configuration.

For example, a wireless device may perform the measurement for a specific cell based on the measurement configuration.

For example, a wireless device may perform at least one of SS/PBCH block based measurement and/or CSI-RS based measurement within the basic measurement window.

For example, a wireless device may perform the SS/PBCH block based measurement (for example, Reference Signal Receive Power (RSRP), Reference Signal Received Quality (RSRQ), and/or Signal-to-Interference-plus-Noise Ratio (SINR) measurement by using the SS/PBCH block) within a basic SS/PBCH block measurement window.

For example, a wireless device may perform the CSI-RS based measurement (for example, RSRP/RSRQ and/or SINR measurement by using the CSI-RS), within the UE performs the measurement within the CSI-RS measurement window.

In step S1203, a wireless device may perform a measurement within the first additional measurement window, based on measurement results from the basic measurement window.

For example, the wireless device may keep performing the measurement within the first additional measurement window, without stopping the measurement within the basic measurement window.

For example, a wireless device may determine whether to keep performing a measurement within the first additional measurement window, based on (1) a number of beams and/or reference signals measured within the basic measurement window, and (2) a threshold number.

For example, a wireless device may keep performing a measurement within the first additional measurement window, based on determining that the number of beams and/or reference signals (for example, SS/PBCH blocks or CSI-RSs) measured within the basic measurement window is less than the threshold number. In other words, when a wireless device does not acquire enough measurement results from the basic measurement window, the wireless device may continue to perform the measurement within the first additional measurement window.

For example, a wireless device may skip to perform a measurement within the first additional measurement window, based on determining that the number of beams and/or reference signals measured within the basic measurement window is more than or equal to the threshold number. In other words, when a wireless device acquires enough measurement results from the basic measurement window, the wireless device may not perform the measurement within the first additional measurement window.

In step S1204, a wireless device may report, to the network, measurement results from the basic measurement window and the first additional measurement window.

For example, if the wireless device performs a measurement within the first additional measurement window, the wireless device may report the measurement results from the basic measurement window and the first additional measurement window.

For other example, if the wireless device does not perform a measurement within the first additional measurement window, the wireless device may report the measurement results from only the basic measurement window.

According to some embodiments of the present disclosure, the measurement configuration, received from step S1201, may include an information on a second additional measurement window.

For example, the second additional measurement window may start at the end of the first additional measurement window. In other words, the starting point of the second additional measurement window may be the end of the first additional measurement window.

For example, a wireless device may perform a measurement within a second additional measurement window, based on measurement results performed within the basic measurement window and the additional measurement window.

For example, a wireless device may report, to the network, measurement results from the basic measurement window, the first additional measurement window, and the second additional measurement window.

For example, a wireless device may determine whether to keep performing a measurement within the second additional measurement window, based on (1) a number of beams and/or reference signals measured within the basic measurement window and the first measurement window, and (2) a threshold number.

For example, a wireless device may continue to perform a measurement within the second additional measurement window, without stopping a measurement within the basic measurement window and the first additional measurement window, based on determining that the number of beams and/or reference signals measured within the basic measurement window and the first measurement window is less than a threshold number.

In this case, a wireless device may report the measurement results, which is derived by the measurement performed within the basic measurement window, the first additional measurement window, and the second additional measurement window.

For example, a wireless device may finish the measurement after the time period of the first additional measurement window and may not perform a measurement within the second additional measurement window, based on determining that the number of beams and/or reference signals measured within the basic measurement window and the first measurement window is equal to or more than a threshold number.

In this case, a wireless device may report the measurement results, which is derived by the measurement performed within the basic measurement window and the first additional measurement window.

According to some embodiments of the present disclosure, the wireless device may be in communication with at least one of a user equipment, a network, or an autonomous vehicle other than the wireless device.

Figure 13:
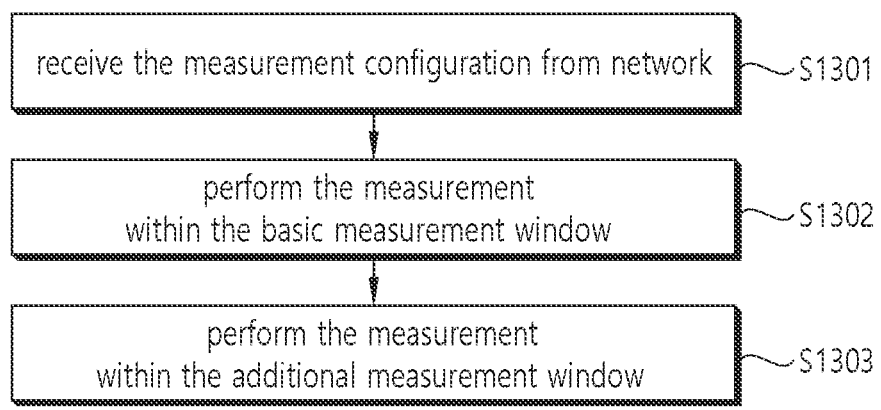
FIG. 13 shows an example of a method for performing measurement under a long propagation delay in a wireless communication system, according to some embodiments of the present disclosure.

FIG. 13 shows an example of a method for performing measurement under a long propagation delay in a wireless communication system, according to some embodiments of the present disclosure.

According to some embodiments of the present disclosure, for a cell, if the number of beams and/or reference signals measured within the first measurement window is less than the minimum required number, the UE may keep performing the measurement within the second measurement window.

In step S1301, a UE may receive the measurement configuration from a network.

For example, the measurement configuration may include a configuration for the basic measurement window (or a default measurement window) and a configuration for the additional measurement window. The basic measurement window may include at least one of a measurement gap, SS/PBCH block measurement window, and/or CSI-RS measurement window. The additional measurement window may include at least one of an additional measurement gap, additional SS/PBCH block measurement window, and/or additional CSI-RS measurement window.

For example, the basic measurement window and/or the additional measurement window may be configured per frequency, per cell, and/or per UE.

For example, the configuration for the additional measurement window may include the length of the additional measurement window and/or the maximum number of additional measurement windows. The starting point of the first additional measurement window may be the end of the basic measurement window.

For example, the measurement configuration may further include information on a specific cell for which the additional measurement window can be applied for the measurement. The specific cell may include an NTN cell. The information on the specific cell may include information on when to measure the specific cell. In case of the NTN cell, the information on when to measure the specific cell may be based on a movement of the satellite.

In step S1302, UE may perform the measurement within the basic measurement window.

For example, UE may perform the measurement for serving cell and/or neighbour cell based on the measurement configuration. UE may perform the measurement for the specific cell based on the measurement configuration.

For example, the measurement may include at least one of SS/PBCH block based measurement and/or CSI-RS based measurement.

For example, when UE performs the SS/PBCH block based measurement (for example, Reference Signal Receive Power (RSRP), Reference Signal Received Quality (RSRQ), and/or Signal-to-Interference-plus-Noise Ratio (SINR) measurement by using the SS/PBCH block), the UE may perform the measurement within the SS/PBCH block measurement window.

For example, when UE performs the Channel State Information Reference Signal (CSI-RS) based measurement, (for example, RSRP/RSRQ and/or SINR measurement by using the CSI-RS), the UE performs the measurement within the CSI-RS measurement window.

In step S1303, UE may perform the measurement within the additional measurement window.

For example, UE may decide whether to keep performing the measurement within the additional measurement window.

For example, UE may decide whether to keep performing the measurement within the additional measurement window based on the measurement result within the basic measurement window.

For example, when the number of beams measured/detected within the basic measurement window is less than a threshold value, UE may perform the measurement within the additional measurement window.

For example, when the number of beams measured/detected within the basic measurement window is more than a threshold value, the UE may not perform the measurement within the additional measurement window. The threshold value can be configured per cell, per frequency, and/or per UE.

For example, a beam threshold may be used to determine whether the beam is measured/detected successfully or not.

For example, the beam threshold may be configured per cell and/or per frequency by network.

For example, UE may measure/detect 5 beams (SS/PBCH block and/or CSI-RS) for a cell within the basic measurement window. Among the measured/detected beams, only the measurement results of 3 beams may be above the beam threshold, then UE may consider the number of measured/detected beams is 3.

In this case, UE may determine whether to keep performing the measurement within the additional measurement window or not, based on comparing the number of measured/detected (for example, 3 beams) with the beam threshold.

For example, more than one additional measurement windows can be configured.

For example, UE may decide whether to keep performing the measurement within the subsequent additional measurement window.

For example, UE may decide whether to keep performing the measurement within the subsequent additional measurement window based on the measurement result within the previous additional measurement window and basic measurement window.

For example, when the number of beams measured/detected within the first additional measurement window and the basic measurement window is less than the threshold value, UE may perform the measurement within the second additional measurement window.

For example, a sum of the number of beams measured/detected within both the first additional measurement window and the basic measurement window is less than the threshold value, UE may perform the measurement within the second additional measurement window.

For example, when the number of beams measured/detected within the first additional measurement window and the basic measurement window is more than the threshold value, the UE may not perform the measurement within the second additional measurement window.

For example, a sum of the number of beams measured/detected within both the first additional measurement window and the basic measurement window is more than the threshold value, UE may not perform the measurement within the second additional measurement window.

According to some embodiments of the present disclosure, upon detecting N-beams (for example N-SS/PBCH blocks or N-CSI-RSs), UE may stop the measurement. The N may be the number of beams for stopping the measurement. The N may or may not be the same as the threshold value.

Figure 14:
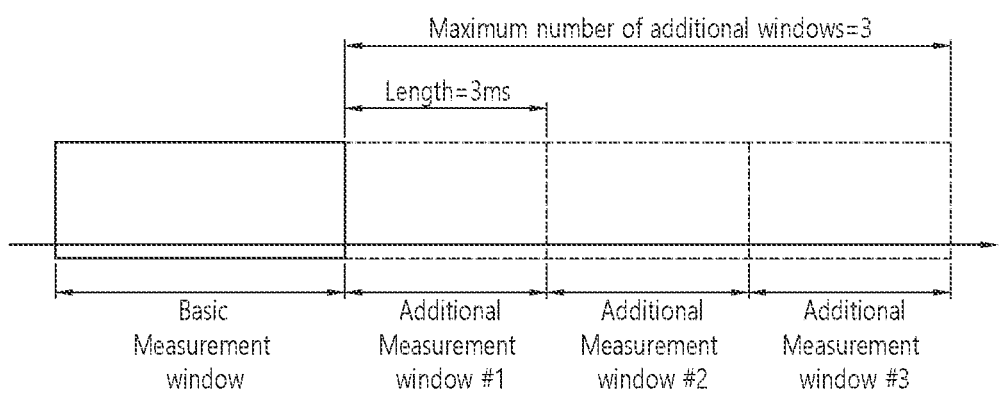
FIG. 14 shows an example of an additional measurement window configuration, according to some embodiments of the present disclosure.

FIG. 14 shows an example of an additional measurement window configuration, according to some embodiments of the present disclosure. In particular, the additional measurement window configuration may include a basic measurement window and additional measurement windows following the basic measurement window.

In FIG. 14, the maximum number of the additional measurement windows may be 3. The length of each of the additional measurement windows may be 3 ms.

Figure 15:
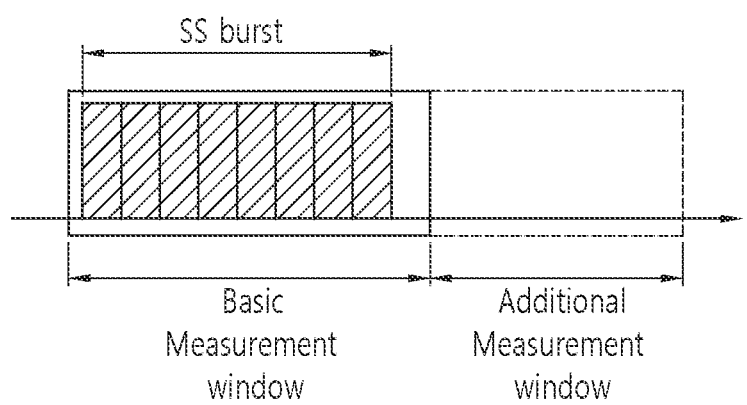
FIG. 15 and FIG. 16 show an example of a method for applying an additional measurement window based on a beam threshold, according to some embodiments of the present disclosure.
Figure 16:
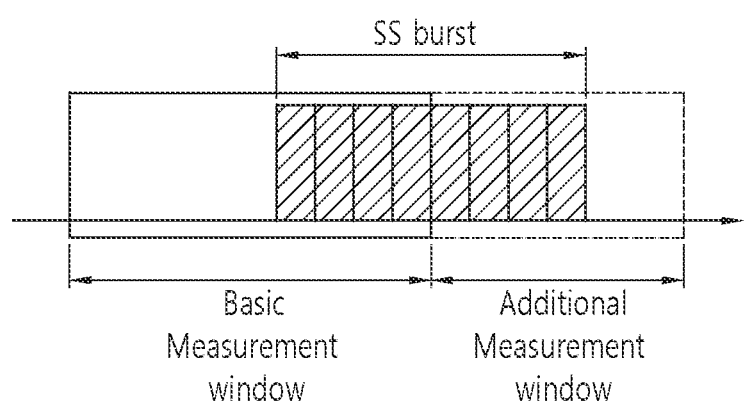

The first additional measurement window may start at the end of the basic measurement window. The second additional measurement window may start at the end of the first additional measurement window. The third additional measurement window may start at the end of the second additional measurement window FIG. 15 and FIG. 16 show an example of a method for applying an additional measurement window based on a beam threshold, according to some embodiments of the present disclosure. In FIG. 15 and FIG. 16, the threshold value for a cell (for example, cell A) may be set to 6.

Referring to FIG. 15, a UE may measure/detect 8 SS/PBCH blocks within a basic measurement window.

Since the UE measures/detects more than 6 SS/PBCH blocks within the basic measurement window, the UE may not perform the measurement within the additional measurement window.

Referring to FIG. 16, a UE may measure/detect 4 SS/PBCH blocks within a basic measurement window.

Since, the UE measures/detects less than 6 SS/PBCH blocks within the basic measurement window, the UE may keep performing the measurement within the additional measurement window.

In this case, the UE could measure/detect 8 SS/PBCH blocks, which is more than the beam threshold (6 SS/PBCH blocks), within the basic measurement window and the additional window, and report the measurement results within the basic measurement window and the additional measurement window, successfully.

Figure 17:
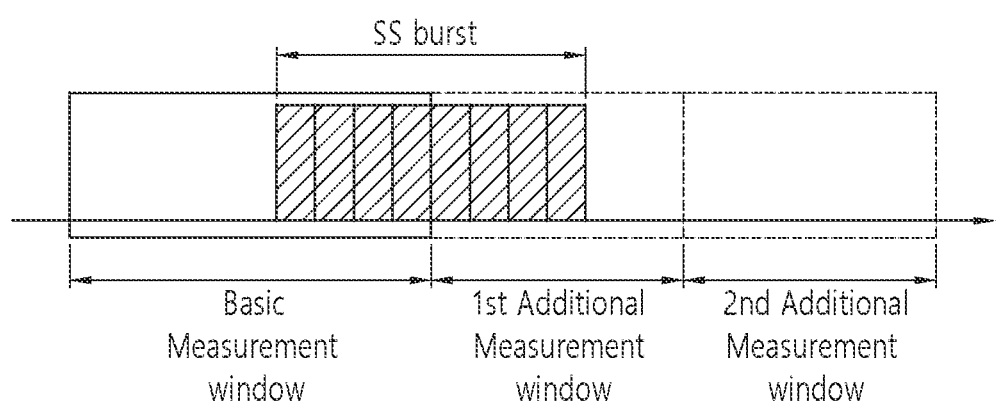
FIG. 17 and FIG. 18 show an example of a method for applying multiple additional measurement windows based on a beam threshold, according to some embodiments of the present disclosure.
Figure 18:
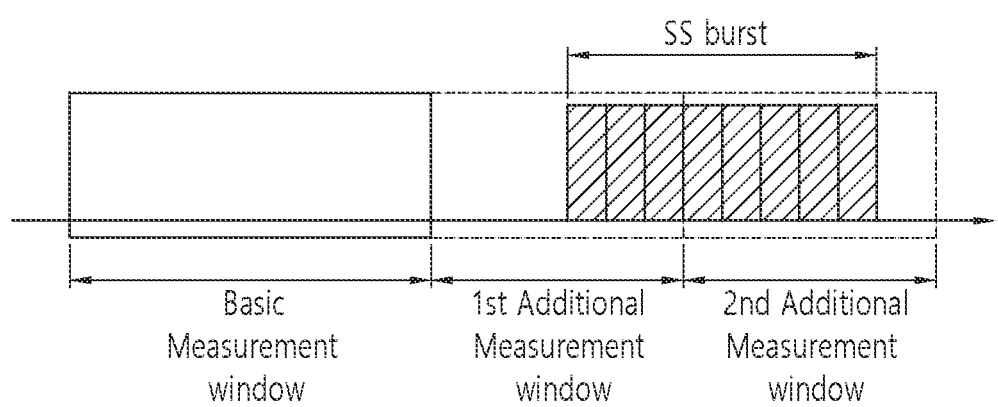

FIG. 17 and FIG. 18 show an example of a method for applying multiple additional measurement windows based on a beam threshold, according to some embodiments of the present disclosure. In FIG. 17 and FIG. 18, the threshold value for the cell (for example, cell A) may be set to 6.

Referring to FIG. 17, a UE may measure/detect 8 SS/PBCH blocks within the basic measurement window and the first additional measurement window.

Since the UE measures/detects more than 6 SS/PBCH blocks within the basic measurement window and the first additional measurement window, the UE may not perform the measurement within the second additional measurement window.

Referring to FIG. 18, a UB may measure/detect 3 SS-PBCH blocks within the basic measurement window and the first additional measurement window.

Since, the UE measures/detects less than 6 SS/PBCH blocks within the basic measurement window and the first additional measurement window, the UE may keep performing the measurement within the additional measurement window (for example the second additional measurement window).

In this case, the UE could measure/detect 8 SS/PBCH blocks, which is more than the beam threshold (6 SS/PBCH blocks), within the basic measurement window, the first additional window, and the second additional measurement window. The UE could report the measurement results within the basic measurement window, the first additional measurement window, and the second additional measurement window, successfully.

Hereinafter, an apparatus for performing measurement under a long propagation delay in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a measurement configuration including an information on a basic measurement window and an information on a first additional measurement window. The processor 102 may be configured to perform a measurement within the basic measurement window. The processor 102 may be configured to perform a measurement within the first additional measurement window, based on measurement results from the basic measurement window. The processor 102 may be configured to report, to the network, measurement results from the basic measurement window and the first additional measurement window.

For example, the first additional measurement window may start at the end of the basic measurement window.

For example, the basic measurement window and/or the first additional measurement window may be configured per frequency and/or per cell.

For example, the measurement configuration may include an information on multiple additional measurements windows. The first additional measurement window may be one of the multiple additional measurements windows.

For example, the measurement configuration may include (1) a length of one additional measurement window among the multiple additional measurement windows, and (2) a maximum number of the multiple additional measurement windows.

For example, the basic measurement window and the first additional measurement window may include at least one of (1) a measurement gap, (2) a synchronization signals (SS) and/or physical broadcast channel (PBCH) block measurement window, and/or (3) Channel State Information Reference Signal (CSI-RS) measurement window.

According to some embodiments of the present disclosure, the processor 102 may be configured to determine whether to keep performing a measurement within the first additional measurement window, based on (1) a number of beams and/or reference signals measured within the basic measurement window, and (2) a threshold number.

For example, the processor 102 may be configured to keep performing a measurement within the first additional measurement window, based on determining that the number of beams and/or reference signals measured within the basic measurement window is less than the threshold number.

For example, the processor 102 may be configured to skip to perform a measurement within the first additional measurement window, based on determining that the number of beams and/or reference signals measured within the basic measurement window is more than or equal to the threshold number.

For example, the threshold number may be included in the measurement configuration.

According to some embodiments of the present disclosure, the measurement configuration may include an information on a second additional measurement window.

For example, the processor 102 may be configured to perform a measurement within a second additional measurement window, based on measurement results performed within the basic measurement window and the additional measurement window.

For example, the reporting measurement results may include reporting, to the network, measurement results from the basic measurement window, the first additional measurement window, and the second additional measurement window.

For example, the processor 102 may be configured to determine whether to keep performing a measurement within the second additional measurement window, based on (1) a number of beams and/or reference signals measured within the basic measurement window and the first measurement window, and (2) a threshold number.

According to some embodiments of the present disclosure, the processor 102 may be configured to be in communication with at least one of a user equipment, a network, or an autonomous vehicle other than the wireless device.

Hereinafter, a processor for a wireless device for performing measurement under a long propagation delay in a wireless communication system, according to some embodiments of the present disclosure, will be described.

The processor may be configured to control the wireless device to receive, from a network, a measurement configuration including an information on a basic measurement window and an information on a first additional measurement window. The processor may be configured to control the wireless device to perform a measurement within the basic measurement window. The processor may be configured to control the wireless device to perform a measurement within the first additional measurement window, based on measurement results from the basic measurement window. The processor may be configured to control the wireless device to report, to the network, measurement results from the basic measurement window and the first additional measurement window.

For example, the first additional measurement window may start at the end of the basic measurement window.

For example, the basic measurement window and/or the first additional measurement window may be configured per frequency and/or per cell.

For example, the measurement configuration may include an information on multiple additional measurements windows. The first additional measurement window may be one of the multiple additional measurements windows.

For example, the measurement configuration may include (1) a length of one additional measurement window among the multiple additional measurement windows, and (2) a maximum number of the multiple additional measurement windows.

For example, the basic measurement window and the first additional measurement window may include at least one of (1) a measurement gap, (2) a synchronization signals (SS) and/or physical broadcast channel (PBCH) block measurement window, and/or (3) Channel State Information Reference Signal (CSI-RS) measurement window.

According to some embodiments of the present disclosure, the processor may be configured to control the wireless device to determine whether to keep performing a measurement within the first additional measurement window, based on (1) a number of beams and/or reference signals measured within the basic measurement window, and (2) a threshold number.

For example, the processor may be configured to control the wireless device to keep performing a measurement within the first additional measurement window, based on determining that the number of beams and/or reference signals measured within the basic measurement window is less than the threshold number.

For example, the processor may be configured to control the wireless device to skip to perform a measurement within the first additional measurement window, based on determining that the number of beams and/or reference signals measured within the basic measurement window is more than or equal to the threshold number.

For example, the threshold number may be included in the measurement configuration.

According to some embodiments of the present disclosure, the measurement configuration may include an information on a second additional measurement window.

For example, the processor may be configured to control the wireless device to perform a measurement within a second additional measurement window, based on measurement results performed within the basic measurement window and the additional measurement window.

For example, the reporting measurement results may include reporting, to the network, measurement results from the basic measurement window, the first additional measurement window, and the second additional measurement window.

For example, the processor may be configured to control the wireless device to determine whether to keep performing a measurement within the second additional measurement window, based on (1) a number of beams and/or reference signals measured within the basic measurement window and the first measurement window, and (2) a threshold number.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for performing measurement under a long propagation delay in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a measurement configuration including an information on a basic measurement window and an information on a first additional measurement window. The stored a plurality of instructions may cause the wireless device to perform a measurement within the basic measurement window. The stored a plurality of instructions may cause the wireless device to perform a measurement within the first additional measurement window, based on measurement results from the basic measurement window. The stored a plurality of instructions may cause the wireless device to report, to the network, measurement results from the basic measurement window and the first additional measurement window.

For example, the first additional measurement window may start at the end of the basic measurement window.

For example, the basic measurement window and/or the first additional measurement window may be configured per frequency and/or per cell.

For example, the measurement configuration may include an information on multiple additional measurements windows. The first additional measurement window may be one of the multiple additional measurements windows.

For example, the measurement configuration may include (1) a length of one additional measurement window among the multiple additional measurement windows, and (2) a maximum number of the multiple additional measurement windows.

For example, the basic measurement window and the first additional measurement window may include at least one of (1) a measurement gap, (2) a synchronization signals (SS) and/or physical broadcast channel (PBCH) block measurement window, and/or (3) Channel State Information Reference Signal (CSI-RS) measurement window.

According to some embodiments of the present disclosure, the stored a plurality of instructions may cause the wireless device to determine whether to keep performing a measurement within the first additional measurement window, based on (1) a number of beams and/or reference signals measured within the basic measurement window, and (2) a threshold number.

For example, the stored a plurality of instructions may cause the wireless device to keep performing a measurement within the first additional measurement window, based on determining that the number of beams and/or reference signals measured within the basic measurement window is less than the threshold number.

For example, the stored a plurality of instructions may cause the wireless device to skip to perform a measurement within the first additional measurement window, based on determining that the number of beams and/or reference signals measured within the basic measurement window is more than or equal to the threshold number.

For example, the threshold number may be included in the measurement configuration.

According to some embodiments of the present disclosure, the measurement configuration may include an information on a second additional measurement window.

For example, the stored a plurality of instructions may cause the wireless device to perform a measurement within a second additional measurement window, based on measurement results performed within the basic measurement window and the additional measurement window.

For example, the reporting measurement results may include reporting, to the network, measurement results from the basic measurement window, the first additional measurement window, and the second additional measurement window.

For example, the stored a plurality of instructions may cause the wireless device to determine whether to keep performing a measurement within the second additional measurement window, based on (1) a number of beams and/or reference signals measured within the basic measurement window and the first measurement window, and (2) a threshold number.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for measurement under a long propagation delay in a wireless communication system, according to some embodiments of the present disclosure, will be described.

The BS may transmit, to a first wireless device, a first measurement configuration including an information on a first basic measurement window and an information on a first additional measurement window. The BS may receive, from the first wireless device, measurement results from the first basic measurement window and the first additional measurement window.

According to some embodiments of the present disclosure, the BS may transmit, to a first wireless device, a first measurement configuration including an information on a first basic measurement window and an information on a first additional measurement window. The BS may transmit, to a second wireless device, a second measurement configuration including an information on a second basic measurement window. The BS may receive, from the first wireless device, measurement results from the first basic measurement window and the first additional measurement window. The BS may receive, from the second wireless device, measurement results from the second basic measurement window.

In other words, the BS could determine whether to provide the additional measurement window per wireless device.

Hereinafter, a base station (BS) for measurement under a long propagation delay in a wireless communication system, according to some embodiments of the present disclosure, will be described.

The BS may include a transceiver, a memory, and a processor operatively coupled to the transceiver and the memory.

The processor may be configured to control the transceiver to transmit, to a first wireless device, a first measurement configuration including an information on a first basic measurement window and an information on a first additional measurement window. The processor may be configured to control the transceiver to receive, from the first wireless device, measurement results from the first basic measurement window and the first additional measurement window.

The present disclosure can have various advantageous effects.

According to some embodiments of the present disclosure, a wireless device could efficiently perform measurement under a long propagation delay.

For example, when enough beams are not measured within a measurement window, a wireless device could perform the measurement within the additional measurement window.

For example, a wireless device could measure a serving cell and/or neighbour cells properly by using the additional measurement window.

For example, a wireless device could report the proper measurement results to the network, by performing the measurement within the additional measurement window.

According to some embodiments of the present disclosure, a wireless communication system could efficiently provide a solution for measurement under a long propagation delay.

For example, the network could make a desirable mobility decision based on the proper measurement results reported by the wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
receiving, by a wireless device from a network, a measurement configuration including i) information related to a basic measurement window, ii) information related to a first additional measurement window, iii) and information related to a second additional measurement window;
performing, by the wireless device, a measurement within the basic measurement window;
performing, by the wireless device, a measurement within the first additional measurement window, based on measurement results from the basic measurement window;
performing, by the wireless device, a measurement within a second additional measurement window, based on measurement results performed within the basic measurement window and the first additional measurement window; and
reporting, by the wireless device to the network, measurement results from the basic measurement window, the first additional measurement window, and the second additional measurement window.

2. The method of claim 1, wherein the method further comprises,
determining, by the wireless device, whether to keep performing a measurement within the first additional measurement window, based on (1) a number of beams and/or reference signals measured within the basic measurement window, and (2) a threshold number.

3. The method of claim 2, wherein the method further comprises,
keeping, by the wireless device, performing a measurement within the first additional measurement window, based on determining that the number of beams and/or reference signals measured within the basic measurement window is less than the threshold number.

4. The method of claim 2, wherein the method further comprises,
skipping, by the wireless device, performing a measurement within the first additional measurement window, based on determining that the number of beams and/or reference signals measured within the basic measurement window is more than or equal to the threshold number.

5. The method of claim 2, wherein the threshold number is included in the measurement configuration.

6. The method of claim 1, wherein the method further comprises,
   determining, by the wireless device, whether to keep performing a measurement within the second additional measurement window, based on (1) a number of beams and/or reference signals measured within the basic measurement window and the first additional measurement window, and (2) a threshold number.

7. The method of claim 1, wherein the first additional measurement window starts at the end of the basic measurement window.

8. The method of claim 1, wherein the basic measurement window and/or the first additional measurement window is configured per frequency and/or per cell.

9. The method of claim 1, wherein the measurement configuration includes an information on multiple additional measurements windows, and
   wherein the first additional measurement window is one of the multiple additional measurements windows.

10. The method of claim 9, wherein the measurement configuration includes (1) a length of one additional measurement window among the multiple additional measurement windows, and (2) a maximum number of the multiple additional measurement windows.

11. The method of claim 1, wherein the basic measurement window and the first additional measurement window includes at least one of (1) a measurement gap, (2) a synchronization signals (SS) and/or physical broadcast channel (PBCH) block measurement window, and/or (3) Channel State Information Reference Signal (CSI-RS) measurement window.

12. The method of claim 1, wherein the wireless device is in communication with at least one of a user equipment, a network, or an autonomous vehicle other than the wireless device.

13. A wireless device, comprising:
    a transceiver;
    a memory; and
    at least one processor operatively coupled to the transceiver and the memory, and adapted to perform operations, the operations comprising:
    receiving, from a network, a measurement configuration including i) information related to a basic measurement window, ii) information related to a first additional measurement window, iii) and information related to a second additional measurement window;
    performing a measurement within the basic measurement window;
    performing a measurement within the first additional measurement window, based on measurement results from the basic measurement window;
    performing a measurement within a second additional measurement window, based on measurement results performed within the basic measurement window and the first additional measurement window; and
    reporting, to the network, measurement results from the basic measurement window, the first additional measurement window, and the second additional measurement window.

14. The wireless device of claim 13, wherein the operations further comprise:
    determining whether to keep performing a measurement within the first additional measurement window, based on (1) a number of beams and/or reference signals measured within the basic measurement window, and (2) a threshold number.

15. The wireless device of claim 14, wherein the operations further comprise:
    keeping performing a measurement within the first additional measurement window, based on determining that the number of beams and/or reference signals measured within the basic measurement window is less than the threshold number.

16. The wireless device of claim 14, wherein the operations further comprise:
    skipping performing a measurement within the first additional measurement window, based on determining that the number of beams and/or reference signals measured within the basic measurement window is more than or equal to the threshold number.

* * * * *